(12) United States Patent
Fukuchi (10) Patent No.: US 8,174,659 B2
(45) Date of Patent: May 8, 2012

(54) COLOR FILTER SUBSTRATE AND COLOR DISPLAY DEVICE INCLUDING THE SAME

(75) Inventor: Takakazu Fukuchi, Chiba (JP)

(73) Assignee: Seiko Instruments Inc. (JP)

( * ) Notice: Subject to any disclaimer, the term of this patent is extended or adjusted under 35 U.S.C. 154(b) by 713 days.

(21) Appl. No.: 12/378,182

(22) Filed: Feb. 11, 2009

(65) Prior Publication Data
US 2009/0207100 A1    Aug. 20, 2009

(30) Foreign Application Priority Data
Feb. 13, 2008    (JP) ................... 2008-031612

(51) Int. Cl.
*G02F 1/1343* (2006.01)
*G02F 1/1333* (2006.01)

(52) U.S. Cl. ......... 349/146; 349/142; 349/143; 349/158

(58) Field of Classification Search .................. 349/146, 349/142, 143, 158
See application file for complete search history.

(56) References Cited

U.S. PATENT DOCUMENTS

| 6,690,448 B2 * | 2/2004 | Kawase et al. ................ 349/187 |
| 6,741,305 B2 * | 5/2004 | Nakagawa et al. ........... 349/106 |
| 7,215,392 B2 * | 5/2007 | Nakano et al. ................ 349/106 |

* cited by examiner

*Primary Examiner* — Mike Qi
(74) *Attorney, Agent, or Firm* — Adams & Wilks (57) ABSTRACT

A color filter substrate has unit pixels each having an area of 0.1 mm² or more. Each unit pixel is formed of sub-pixels having a different color from one another and having areas that are substantially equal to one another. Each sub-pixel is formed of a continuous planar region having a maximum line width that does not exceed 150 μm. The sub-pixels are configured with a shape such that the sub-pixels form a preselected engagement pattern via which the adjacent sub-pixels engage one another.

23 Claims, 6 Drawing Sheets

PRIOR ART

FIG. 13B

PRIOR ART

FIG. 14

PRIOR ART

ND COLOR
COLOR FILTER SUBSTRATE AND COLOR DISPLAY DEVICE INCLUDING THE SAME

BACKGROUND OF THE INVENTION

1. Field of the Invention

The present invention relates to a color filter substrate including a unit pixel having a relatively large area, and to a color display device using the color filter substrate, such as a liquid crystal display device and an EL element.

2. Description of the Related Art

A liquid crystal display device that performs color display and a color display device using a PDP or an EL element have been put into practical use. In each of these display devices, for example, one unit pixel is formed of sub-pixels of three colors which are red (R), green (G) and blue (B), and multi-color display is performed by an additive color mixture. At this time, an area of the unit pixel is reduced, whereby a viewer is not allowed to individually recognize the respective sub-pixels. In such a way, the additive color mixture is enabled.

Figure 13A:
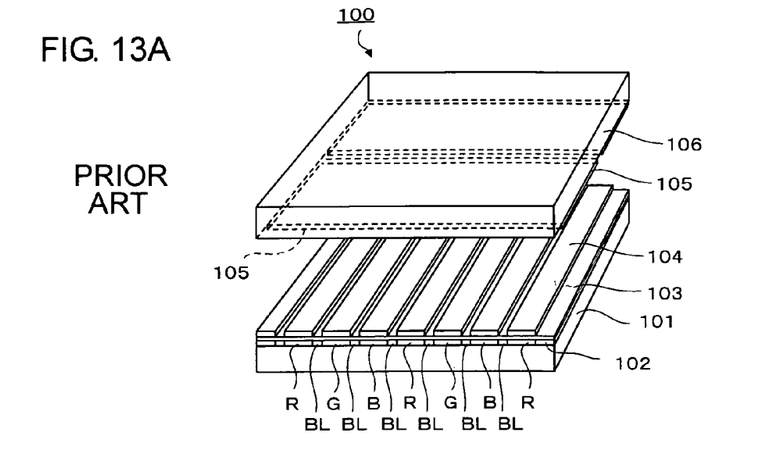
FIG. 13A is an exploded perspective view of a liquid crystal display device conventionally known in public.
Figure 13B:
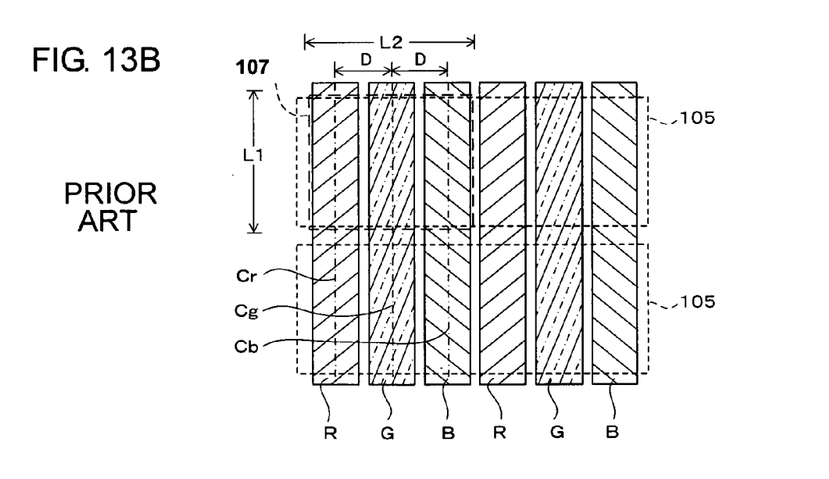
FIG. 13B is an explanatory view illustrating a layout of color filters of the liquid crystal display device.

FIG. 13A is a perspective view schematically illustrating a state where a liquid crystal display device 100 including color filters is disassembled, and FIG. 13B is an explanatory view illustrating a layout of the color filters. In FIG. 13A, color filters 102 are formed on a lower substrate 101. The color filters 102 include stripe-like colored layers formed of respective colors of R, G and B, and black masks (BL) formed among these colored layers in order to prevent leakage of light. A planarization film 103 is formed on the color filters 102, and stripe-like transparent electrodes 104 are formed on the planarization film 103. The colored layers of R, G and B and the transparent electrodes 104 are patterned so as to have the same stripe-like shape. Opposing transparent electrodes 105 are formed on an inner surface of an upper substrate 106. A liquid crystal (not shown) is filled between the upper substrate 106 and the lower substrate 101, whereby a liquid crystal panel is formed. Further, a polarization plate (not shown) and a backlight (not shown) are arranged under the lower substrate 101, and a polarization plate (not shown) is disposed on the top surface of the upper substrate 106. This liquid crystal display device 100 applies voltages between the transparent electrodes 104 on the lower substrate 101 and the opposing transparent electrodes 105 on the upper substrate 106, and thereby changes molecular alignment directions of the liquid crystal. Then, the liquid crystal display device 100 visualizes this change of the molecular alignment direction of the liquid crystal by the polarization plates, and thereby performs display.

FIG. 13B illustrates a state of the color filters 102 on the lower substrate 101 when viewed from the above. Here, the transparent electrodes 105 formed on the inner surface of the upper substrate 106 are illustrated by dotted lines. The respective colored layers of R, G and B are arranged regularly. Each intersecting portion of the colored layers of R, G and B and the opposing transparent electrodes 105, that is, a region surrounded by a broken line of FIG. 13B is a unit pixel 107. Hence, regions of the respective colored layers in the region surrounded by the broken line illustrating the unit pixel 107 correspond to the sub-pixels. The voltages are applied between the transparent electrodes 104 and the opposing transparent electrodes 105, whereby quantities of light that passes through the color filters are changed independently for each of the colors. In such a way, the viewer who views the light transmitted through the color filters is able to view a color image subjected to the additive color mixture.

Figure 14:
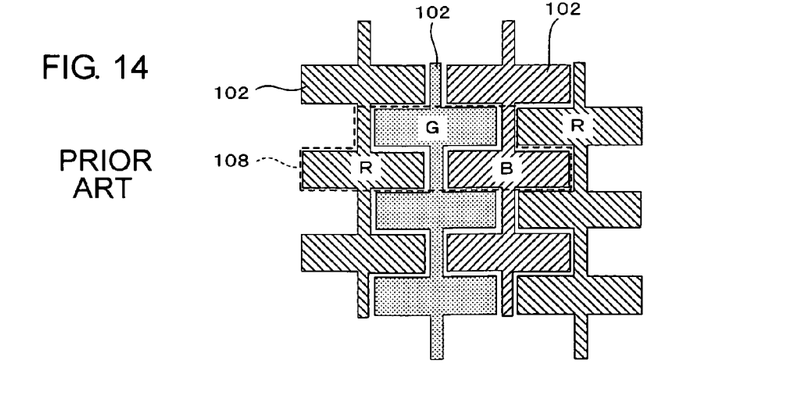
FIG. 14 is an explanatory view illustrating another layout of the color filters of the liquid crystal display device conventionally known in public.

In the above-mentioned conventional example, the respective color filters are formed of the stripe-like colored layers, and the unit pixel has the respective rectangular colored layers arranged in parallel therein. As opposed to this, in color filters 102 illustrated in FIG. 14, adjacent colored layers are formed so as to engage with one another (for example, refer to Japanese Utility Model Application Laid-open No. Sho 60-21723). The respective colored layers are formed into the stripe shape, formed so as to have projection/depression portions in plan view, and formed so that the projection/depression portions of the adjacent colored layers can engage with one another. A broken line of FIG. 14 forms a unit pixel 108, and has a triangular shape. Likewise, in each of JP 2002-221917 A and JP 2005-62416 A, a layout of color filters is described, in which the respective sub-pixels have a triangular or hexagonal shape, and unit pixels are arranged in delta.

In a liquid crystal display device for use in a usual notebook computer, a length L1 or L2 of one side of the unit pixel 107 is 100 to 180 μm. A width of each of the colored layers of the unit pixel 107 is approximately 30 to 50 μm. Hence, an area of the unit pixel 107 is approximately 0.01 to 0.03 mm². Further, when a longitudinal centerline of such a colored layer of R is defined as Cr, and likewise, a centerline of a colored layer of G is defined as Cg, and a centerline of a colored layer of B is defined as Cb, a distance D between the centerlines Cr and Cg becomes approximately 30 to 60 μm, and a distance between the centerlines Cr and Cb becomes approximately 60 to 120 μm.

By means of eyesight of 1.0 in accordance with the Landolt ring, a gap of 1.5 mm can be recognized from a position apart therefrom by 5 m. Specifically, a minimum gap recognizable to be separated when being viewed by a viewer with the eyesight of 1.0 from a point apart therefrom by 50 cm is approximately 150 μm, and a minimum gap when being viewed by the same viewer from a point apart therefrom by 60 cm is approximately 180 μm. In the liquid crystal display device using the color filters having the conventional configuration, a distance between the centerline Cr of the colored layer of R and the centerline Cb of the colored layer of B located while interposing the colored layer of G therebetween is approximately 150 μm at the maximum, in other words, when the viewer with the eyesight of 1.0 views the display screen from the point apart therefrom by 50 cm, a distance between the centerline Cr of the colored layer of R and the centerline Cb of the colored layer of B located while interposing the colored layer of G therebetween is 150 μm at the maximum. Accordingly, the regions of the respective colored layers cannot be visually recognized to be separated from one another, and the viewer will view a color obtained by the additive color mixture. Hence, the viewer can view the image without being conscious of the colored regions of the respective colors, which form the unit pixel. The same also applies to a PDP display device, an EL display device or a reflection-type display device as well as the liquid crystal display device.

However, in the case of performing the color display on a display device in which an alignment pitch of such unit pixels is coarse and an area of each unit pixel is large, the additive color mixture is not performed with the conventional configuration of the unit pixel, and display quality of the display device is decreased. For example, in the case where the pitch of the colored layers forming the unit pixel exceeds 150 μm and the area of the unit pixel is 0.1 mm² or more, there has been a problem that the additive color mixture is not performed in the unit pixel because the respective colored layers look separated from each other.

SUMMARY OF THE INVENTION

In view of the foregoing drawbacks in the conventional art, it is an object of the present invention to realize a color filter substrate that allows the viewer to visually recognize the color subjected to the additive color mixture even in the case where the area of the unit pixel is 0.1 mm$^2$ or more. Therefore, a color filter substrate according to the present invention includes unit pixels arranged two-dimensionally, each of which is formed of a plurality of sub-pixels different in color from each other or one another. Each of the unit pixels has an area of 0.1 mm$^2$ or more. The plurality of sub-pixels has areas substantially equal to each other or one another. Each of the plurality of sub-pixels is formed of a continuous planar region having a line width of up to 150 mm and excluding a square region with sides of 150 μm or more, and has a shape engaging with a sub-pixel adjacent thereto.

Further, the area of each of the unit pixels is 0.25 mm$^2$ or more. Each of the unit pixels includes at least three sub-pixels different in color. A second sub-pixel is disposed between a first sub-pixel and a third sub-pixel in each of the unit pixels.

Further, the plurality of sub-pixels included in each of the unit pixels and the plurality of sub-pixels included in another unit pixel adjacent to each of the unit pixels are different in one of shape and arrangement from each other.

Further, a plurality of transparent electrodes corresponding to each of the plurality of sub-pixels, having substantially the same planar shapes as a planar shape of each of the plurality of sub-pixels, and electrically insulated from each other or one another are formed. The plurality of transparent electrodes have wiring resistances substantially equal to one another between one side of an outer periphery of each of the unit pixels and another side thereof opposed to the one side.

Further, a plurality of additional electrodes connected to each of the plurality of transparent electrodes is formed. A sum of wiring resistances of a transparent electrode and an additional electrode corresponding to one sub-pixel and a sum of wiring resistances of a transparent electrode and an additional electrode corresponding to another sub-pixel are substantially equal to each other.

A liquid crystal display device is configured by including a liquid crystal filled between the color filter substrate having any one of the above-mentioned configurations and an opposing substrate.

Alternatively, a display body is configured by including a display surface. The display surface includes unit pixels arranged two-dimensionally. Each of the unit pixels is formed of a plurality of sub-pixels different in display color from each other or one another. Each of the unit pixels has an area of 0.1 mm$^2$ or more. The plurality of sub-pixels each has areas substantially equal to each other or one another. Each of the plurality of sub-pixels is formed of a continuous planar region having a line width of up to 150 μm and excluding a square region with sides of 150 μm or more, and has a shape engaging with a sub-pixel adjacent thereto.

BRIEF DESCRIPTION OF THE DRAWINGS

In the accompanying drawings.

DETAILED DESCRIPTION OF THE PREFERRED EMBODIMENTS

In a color filter substrate of the present invention, one unit pixel is formed of a plurality of sub-pixels different in color from each other or one another. An area of one unit pixel is 0.1 mm$^2$ or more. The respective sub-pixels have areas substantially equal to each other or one another. Further, each of the sub-pixels is formed of a continuous planar region, in which a line width does not exceed 150 μm, or which does not include therein a square region with sides of 150 μm or more. More preferably, each of the sub-pixels is formed of a continuous planar region, in which the line width does not exceed 100 μm, or which does not include therein a square region with sides of 100 μm or more. Further, each of the sub-pixels and the sub-pixel adjacent thereto has shapes engaging with each other. Specifically, the line width of one sub-pixel does not exceed 150 μm, or the sub-pixel does not include the square region with sides of 150 μm therein, and accordingly, an interval among center portions of regions of the adjacent sub-pixels does not generally exceed 150 μm. As a result, even in the case where the area of the unit pixel is as relatively large as 0.1 mm$^2$ or more, additive color mixture is obtained between or among the adjacent sub-pixels. If a display element is formed by using this color filter substrate, display quality of the display element can be prevented from being decreased. The same also applies to the case of forming the display element by using a color layout of this color filter substrate. Further, the areas of the respective sub-pixels are set equal to each other or one another, and hence a color balance can be held therebetween or thereamong.

Here, in a color filter substrate in which each of the unit pixels is formed of two sub-pixels, colors in a complementary color relationship can be assigned to the sub-pixels. For example, those colors are a combination of yellow (Y) and blue (B), red (R) and green (G), or magenta (M) and green (G). The area of each of the unit pixels is set at 0.1 mm$^2$ or more. Moreover, in the case where each of the unit pixels is formed of three sub-pixels, R, G and B are assigned to the respective sub-pixels. Alternatively, M, Y and cyan (C) are assigned to the respective sub-pixels. The area of each of the unit pixels is set at 0.25 mm$^2$ or more. Each of the sub-pixels has the continuous planar shape, and accordingly, a configuration is formed, in which one sub-pixel is sandwiched between two sub-pixels. Hence, the sub-pixel located on the middle necessarily contacts an outer periphery of the unit pixel by two spots. The same also applies to the case of more than three sub-pixels.

As described above, each of the sub-pixels includes the continuous planar region, in which the line width does not exceed 150 μm, or which does not include the square region with sides of 150 μm or more. Further, each of the sub-pixels has the shape engaging with the sub-pixel adjacent thereto. Hence, as the area of each of the unit pixels becomes larger, each of the sub-pixels has a shape having more projection/depression portions, or a shape more serpentine along projection/depression portions of the sub-pixel adjacent thereto. For example, a length of a boundary line between the adjacent sub-pixels is set at a half or more of a length of the outer periphery of the unit pixel. Preferably, the length of the boundary line concerned is set at three-fourths or more of the length of the outer periphery of the unit pixel. As the area of the unit pixel becomes larger, the length of the boundary line becomes longer.

Further, among the plurality of sub-pixels forming the unit pixel, the sub-pixels located on both end portions thereof can be formed into a shape having the projection/depression portions, in which projection/depression portions are further provided on the projection portion. Further, in the case where the unit pixel has three or more sub-pixels, the second sub-pixel sandwiched between the first and third sub-pixels on both end portions thereof has a shape serpentine along such a projection/depression shape of the first or third pixel. Further, it is not always necessary that the unit pixel be square or rectangular. For example, the unit pixel may have a triangular shape, a hexagonal shape, or other serpentine shapes, or may have a circular shape or an ellipsoidal shape.

Further, when the color filter substrate of the present invention is applied to the display element, a periodic shape is not allowed to be included in the planar shapes of the respective sub-pixels included in the unit pixel in order to prevent an occurrence of moiré on a display surface of the display element. The moiré refers to a stripe pattern viewed when one periodic pattern and the other periodic pattern overlap each other. Further, in the case of forming the display surface by arraying the plurality of unit pixels two-dimensionally, the adjacent unit pixels are made to differentiate arrangement and shape of the sub-pixels included therein from each other. In such a way, the occurrence of the moiré can be suppressed.

Further, transparent electrodes are formed so as to correspond to the plurality of respective sub-pixels. Planar shapes of the transparent electrodes are substantially the same as the shapes of the sub-pixels corresponding thereto, and the transparent electrodes are electrically insulated from each other or one another. A plurality of the transparent electrodes are each formed so that wiring resistances thereof can be substantially equal to each other or one another between one side of the unit pixel and the other side thereof opposed to the one side. For example, in the case where this color filter substrate is applied to a liquid crystal display device, and liquid crystal is driven by giving drive signals to those transparent electrodes, voltage drops occur in the drive signals owing to the wiring resistances of the transparent electrodes. When the voltage drops differ between or among the respective sub-pixels, drive signals with different voltages are given to a liquid crystal layer on the respective sub-pixels. Therefore, it becomes impossible to obtain a desired display color. In this connection, the wiring resistances of the transparent electrodes corresponding to the respective sub-pixels are set substantially equal to each other or one another between or among the respective sub-pixels. In such a way, even if the voltage drops owing to the wiring resistances occur, the color balance becomes free from distortion, and the decrease in display quality is prevented.

Further, the sub-pixels are formed into the mutually serpentine planar shapes for the purpose of obtaining the additive color mixture therebetween or thereamong, and hence it is sometimes difficult to form the transparent electrodes corresponding to the respective sub-pixels so that the wiring resistances thereof can be substantially equal to each other or one another. In such a case, additional electrodes for correcting a difference in wiring resistance are formed outside of one side of the unit pixel, and are electrically connected to the transparent electrodes corresponding to the respective sub-pixels. Specifically, a plurality of the additional electrodes electrically connected to the plurality of respective transparent electrodes on such one side of the outer periphery of the unit pixel, the additional electrodes serving for correcting the wiring resistances of the transparent electrodes concerned, are formed. Further, a total wiring resistance of the wiring resistance of the transparent electrode corresponding to one sub-pixel and the wiring resistance of the additional electrode electrically connected to the transparent electrode concerned is set equal to a total wiring resistance of the wiring resistance of the transparent electrode corresponding to the other sub-pixel and the wiring resistance of the additional electrode electrically connected to the transparent electrode concerned. In such a way, even in the case where the wiring resistances of the transparent electrodes cannot be set equal to each other or one another between or among the respective sub-pixels in the unit pixel, the voltage drops of the drive signals can be set substantially equal therebetween or thereamong. Accordingly, the decrease in display quality can be prevented.

Further, the additional electrodes for such correction are provided outside of a display region. In usual, each of drive electrodes is formed by connecting the transparent electrodes corresponding to the sub-pixels of the same color to one another in a line fashion. For example, the transparent electrodes formed so as to individually correspond to red sub-pixels, green sub-pixels and blue sub-pixels are connected in line in a row or column fashion, whereby the drive electrodes are formed. In this case, in the case where the wiring resistances of the drive electrodes corresponding to the respective sub-pixels are varied thereamong, variations occur among the voltage drops of the drive signals given through those drive electrodes, and the display quality is decreased. In this connection, the additional electrodes for correcting the wiring resistances of the drive electrodes are formed outside of the display region. Specifically, the plurality of additional electrodes connected individually to the plurality of transparent electrodes of each of the unit pixels located on one side of an outer periphery of the display region are formed on the one side concerned. Further, a total wiring resistance of the transparent electrodes of the display region, which correspond to the sub-pixels of one color, and of the additional electrode corresponding thereto is set substantially equal to a total wiring resistance of the transparent electrodes of the display region, which correspond to the sub-pixels of the other color, and of the additional electrode corresponding thereto. In such a way, the voltage drops of the drive electrodes formed on the respective sub-pixels are equalized to one another, and the decrease in display quality is prevented.

Note that the color filter substrate of the present invention can constitute a one-side substrate of the liquid crystal display device. Further, the layout of the above-mentioned color filter substrate can be applied not only to the color filter substrate but also to a self emission-type display body and the like.

Further, a color display device of the present invention is a color display device in which a liquid crystal layer is disposed between a color filter substrate having each of unit pixels formed of a plurality of sub-pixels different in color from each other or one another and an opposing substrate opposed to the color filter substrate. Here, each of the unit pixels has an area of 0.1 mm$^2$ or more, the plurality of sub-pixels have areas substantially equal to each other or one another, each of the sub-pixels is formed of a continuous planar region, in which a line width does not exceed 150 μm, or a square region with sides of 150 μm or more is not included, and has a shape engaging with the sub-pixel adjacent thereto, and a plurality of transparent electrodes are formed on any one of the color filter substrate and the opposing substrate. At this time, the plurality of transparent electrodes have substantially the same planar shapes as those of the plurality of respective sub-pixels, and are electrically insulated from each other or one another. Further, the color display device is formed so that electric resistances of the plurality of transparent electrodes can become substantially equal to each other or one another between one side of an outer periphery of each of the unit pixels and the other side opposed thereto.

Using the drawings, a description is specifically made of the present invention.

Embodiment 1

Figure 1:
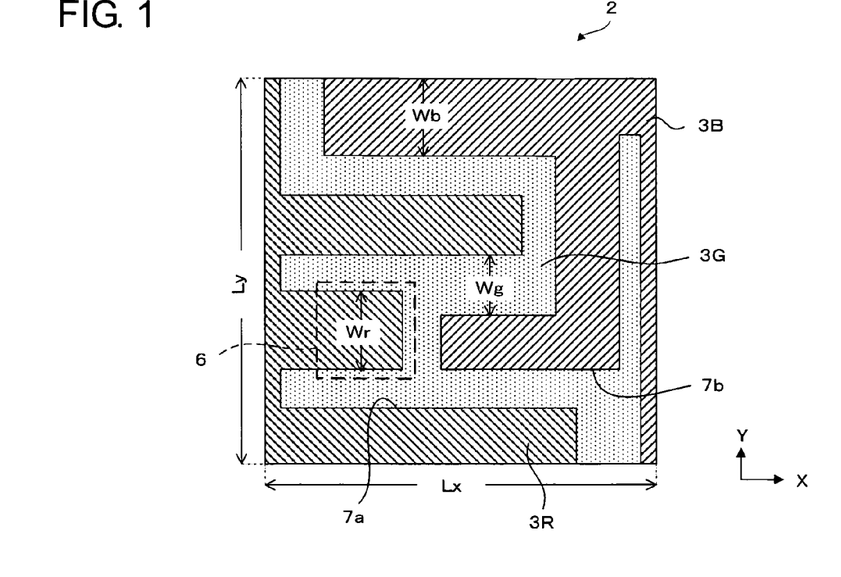
FIG. 1 is a schematic plan view of a color filter substrate according to Embodiment 1 of the present invention.

Based on the drawings, a description is made of a color filter substrate 1 of Embodiment 1 of the present invention. FIG. 1 is a schematic plan view of a unit pixel 2 of the color filter substrate 1.

As illustrated in FIG. 1, the unit pixel 2 includes three sub-pixels, which are a red sub-pixel 3R, a green sub-pixel 3G and a blue sub-pixel 3B from a left side thereof. The three sub-pixels are separated from one another by a boundary line 7a and a boundary line 7b, which are taken as boundaries. The respective sub-pixels are formed of planar regions substantially equal in area to one another. Each of the sub-pixels is formed of a continuous region. Specifically, each of the sub-pixels of the respective colors is formed of one region. The red sub-pixel 3R and the green sub-pixel 3G, which are adjacent to each other, have shapes engaging with each other, and likewise, the green sub-pixel 3G and the blue sub-pixel 3B have shapes engaging with each other. More specifically, the red sub-pixel 3R has three projection portions projecting rightward with respect to a direction from an upper side of the unit pixel 2 toward a lower side thereof. A length of the second projection portion from the upper side is the shortest among those of the three projection portions, and a length of the third projection portion from the upper side is the longest thereamong. The blue sub-pixel 3B has one projection portion projecting leftward with respect to the direction from the upper side of the unit pixel 2 toward the lower side thereof. The projection portion is branched into two, and a tip end of such a projection portion branched downward is bent leftward. The green sub-pixel 3G is formed of a gap region between the red sub-pixel 3R and the blue sub-pixel 3B. Then, the first projection portion and third projection portion of the red sub-pixel 3R, which are counted from the upper side of the unit pixel 2, engage with the projection portion of the blue sub-pixel 3B and the tip end thereof branched downward and bent leftward, respectively. Specifically, the red sub-pixel 3R and the blue sub-pixel 3B have shapes engaging with each other while sandwiching the green sub-pixel 3G therebetween.

Each of maximum line widths Wr, Wg and Wb of the shapes of the red sub-pixel 3R, the green sub-pixel 3G and the blue sub-pixel 3B does not exceed 150 μm. Alternatively, any of the sub-pixels does not have a planar region in which a square region 6 with sides of 150 μm is included. Further, in a layout of the sub-pixels of this embodiment, each of a length of the boundary line 7a between the red sub-pixel 3R and the green sub-pixel 3G and a length of the boundary line 7b between the green sub-pixel 3G and the blue sub-pixel 3B is approximately 90% of a length of an outer periphery of the unit pixel 2. Further, any of the sub-pixels does not have a periodic shape.

An area of the unit pixel 2 of Embodiment 1 is 0.1 mm$^2$ to 0.6 mm$^2$. Further, the planar regions of the maximum line widths Wr, Wg and Wb are formed into the shapes in which the adjacent sub-pixels engage with one another, whereby each of the maximum line widths can be further reduced. In such a way, the area of the unit pixel 2 can be further increased, for example, to 1 mm$^2$ to 2 mm$^2$.

Figure 2:
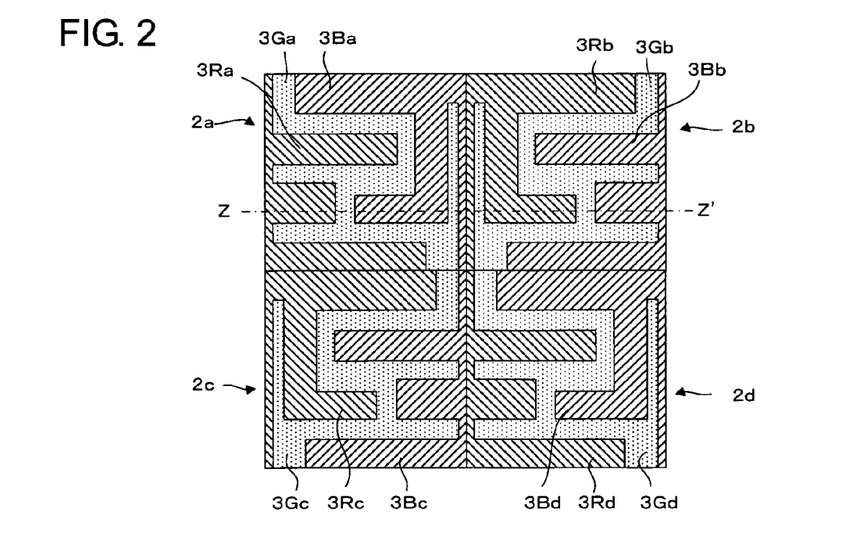
FIG. 2 is a schematic plan view of a color filter substrate according to Embodiment 1 of the present invention.

FIG. 2 is a schematic plan view in which the unit pixels 2 are arranged in a 2×2 fashion. As illustrated in FIG. 2, four unit pixels 2a, 2b, 2c and 2d are formed on the color filter substrate 1. The upper left unit pixel 2a and the lower right unit pixel 2d have the same pattern, and are the same as the unit pixel 2 illustrated in FIG. 1. The upper right unit pixel 2b and the lower left unit pixel 2c have the same pattern, and the unit pixel 2b has a shape mirror-symmetric with respect to the unit pixel 2a. Here, colors are interchanged between a red sub-pixel 3Ra and a blue sub-pixel 3Bb, and colors are interchanged between a blue sub-pixel 3Ba and a red sub-pixel 3Rb. Specifically, the sub-pixels included in each of the unit pixels 2 and the sub-pixels included in the unit pixel 2 adjacent thereto are different from each other in shape or arrangement. Moreover, the respective sub-pixels do not have periodic patterns. In such a way, when the color filter substrate 1 is applied to a liquid crystal display device, or when this color layout is applied to a display element, the occurrence of a moiré effect owing to the periodic patterns is suppressed, and the quality decrease of the display image can be prevented.

Further, the unit pixel 2a and the unit pixel 2c are arranged so that the sub-pixels of the same colors can continue therebetween, and the unit pixel 2b and the unit pixel 2d are arranged so that the sub-pixels of the same colors can continue therebetween. Specifically, the red sub-pixel 3Ra of the unit pixel 2a and the red sub-pixel 3Rc of the unit sub-pixel 2c continue therebetween on a boundary therebetween, and likewise, the green sub-pixel 3Ga of the unit pixel 2a and the green sub-pixel 3Gc of the unit sub-pixel 2c continue therebetween, and the blue sub-pixel 3Ba of the unit pixel 2a and the blue sub-pixel 3Bc of the unit pixel 2c continue therebetween. The same as above also applies to a boundary between the unit pixel 2b and the unit pixel 2d.

Figure 3:
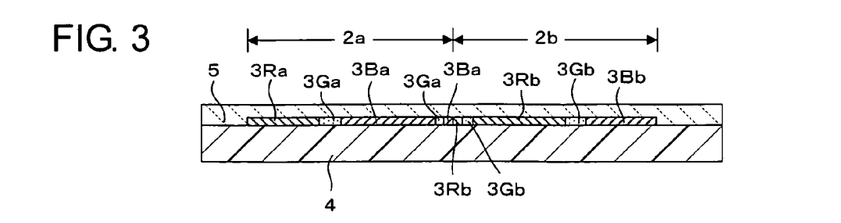
FIG. 3 is a schematic longitudinal cross-sectional view of the color filter substrate according to Embodiment 1 of the present invention.

FIG. 3 is a schematic longitudinal cross-sectional view of the color filter substrate 1, taken along a line Z-Z' of FIG. 2. As illustrated in FIG. 3, the unit pixel 2a and the unit pixel 2b are formed on a substrate 4 made of glass or the like. In order from a left side of FIG. 3, the red sub-pixel 3Ra, the green sub-pixel 3Ga, the blue sub-pixel 3Ba, the green sub-pixel 3Ga and the blue sub-pixel 3Ba form the unit pixel 2a. Further, from a center portion of FIG. 3, the red sub-pixel 3Rb, the green sub-pixel 3Gb, the red sub-pixel 3Rb, the green sub-pixel 3Gb and the blue sub-pixel 3Bb form the unit pixel 2b. A planarization layer 5 for planarizing irregularities of color filter layers are formed on the respective sub-pixels. The color filter layers of the respective sub-pixels are formed of, for example, resin films made of polyimide or the like, into which pigments or dyes of the respective colors are dispersed. The number of unit pixels 2 formed on the single substrate 4 is actually several tens to several millions.

Embodiment 2

Figure 4:
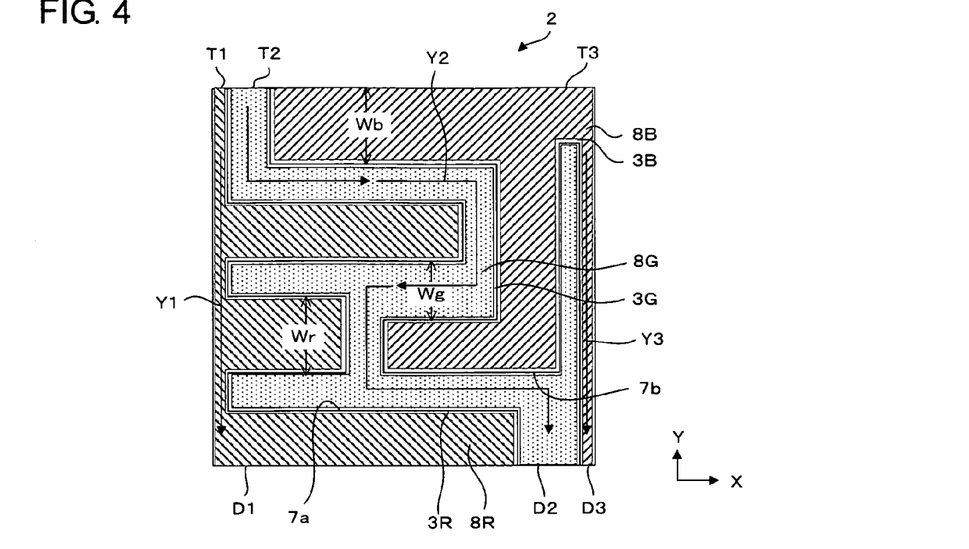
FIG. 4 is a schematic plan view of a color filter substrate according to Embodiment 2 of the present invention.

Based on the drawings, a description is made of a color filter substrate 1 of Embodiment 2 of the present invention. FIG. 4 is a schematic plan view of a unit pixel 2 of the color filter substrate 1.

In FIG. 4, in a similar way to FIG. 1, a red sub-pixel 3R, a green sub-pixel 3G and a blue sub-pixel 3B are formed in the unit pixel 2. Each of the sub-pixels has a planar shape engaging with the sub-pixel adjacent thereto, and areas of the respective sub-pixels are substantially equal to one another. Each of maximum line widths Wr, Wg and Wb of the respective sub-pixels does not exceed 150 μm. Alternatively, each of the sub-pixels does not have a planar shape in which a square region 6 with sides of 150 μm is included. Further, an area of the unit pixel 2 is 0.1 mm² to 0.6 mm². Each of lengths of boundary lines 7a and 7b among the respective sub-pixels is approximately 90% of an outer periphery of the unit pixel. Further, any of the sub-pixels does not have a periodic shape in the unit pixel.

Further, on the respective sub-pixels, transparent electrodes having substantially the same planar shapes as those of the sub-pixels concerned are formed so as to be electrically insulated from one another. Specifically, a transparent electrode 8R corresponding to a red sub-pixel is formed on the red sub-pixel 3R, a transparent electrode 8G corresponding to a green sub-pixel is formed on the green sub-pixel 3G, and a transparent electrode 8B corresponding to a blue sub-pixel is formed on the blue sub-pixel 3B. The respective transparent electrodes are electrically insulated from one another by the boundary line 7a and the boundary line 7b, which are taken as boundaries. The respective transparent electrodes 8R, 8G and 8B are extended to an upper side or lower side of the unit pixel 2 so as to be connectable to the other unit pixel or electrode on the upper side and the lower side thereof. Note that, for the transparent electrodes, a material such as indium tin oxide (ITO) and zinc oxide (ZnO) is used.

Here, the respective transparent electrodes 8R, 8G and 8B are formed so that wiring resistances thereof can be substantially equal to one another from the upper side of the unit pixel 2 to the lower side thereof. The respective transparent electrodes are fabricated of the same material, and hence sheet resistances thereof are the same. Therefore, the wiring resistance of each of the transparent electrodes is determined by a line width and wiring length thereof. The wiring lengths of the respective transparent electrodes 8R, 8G and 8B become the shortest distances thereof from the upper side of the unit pixel 2 to the lower side of the unit pixel 2. Specifically, the shortest length of the red sub-pixel 3R is an arrow Y1 direction distance between an upper side end portion T1 and lower side end portion D1 of the unit pixel 2. The shortest length of the green sub-pixel 3G is an arrow Y2 direction distance between an upper side end portion T2 and lower side end portion D1 of the unit pixel 2. The shortest length of the blue sub-pixel 3B is an arrow Y3 direction distance between an upper side end portion T3 and lower side end portion D3 of the unit pixel 2. Based on such a way of thinking, the planar shapes of the respective sub-pixels 3R, 3G and 3B illustrated in FIG. 4 are determined so that the areas thereof can be substantially equal to one another, and that the wiring resistances of the respective transparent electrodes 8R, 8G and 8B corresponding thereto can also be substantially equal to one another. In summary, the shortest length of the sub-pixel having a portion in which the line width is narrower is shorter, and the shortest length of the sub-pixel in which the line width along the shortest length is wider is longer.

Figure 5:
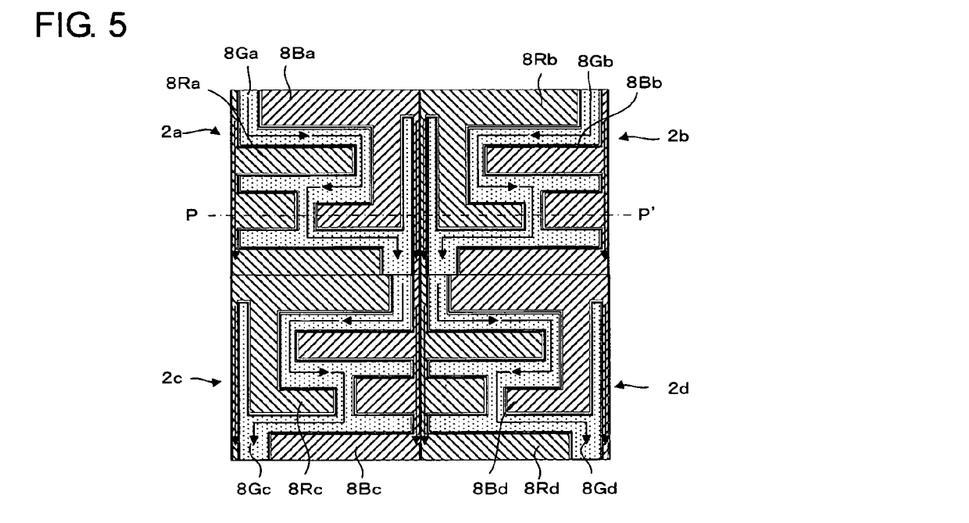
FIG. 5 is a schematic plan view of a color filter substrate according to Embodiment 2 of the present invention.

FIG. 5 is a schematic plan view in which the unit pixels 2 are arranged in the 2×2 fashion. As illustrated in FIG. 5, four unit pixels 2a, 2b, 2c and 2d are formed on the color filter substrate 1. In a similar way to FIG. 2, the upper left unit pixel 2a and the lower right unit pixel 2d have the same pattern, and are the same as the unit pixel 2 illustrated in FIG. 4. The upper right unit pixel 2b and the lower left unit pixel 2c have the same pattern, and this pattern is a pattern mirror-symmetric with respect to the unit pixel 2a, in which colors are interchanged between the red sub-pixel 3R and the blue sub-pixel 3B. Further, on the sub-pixels 3R, 3G and 3B, the transparent electrodes 8R, 8G and 8B are formed, respectively, so as to be electrically insulated from one another.

In the respective transparent electrodes 8R, 8G and 8B on the respective sub-pixels 3R, 3G and 3B, the sub-pixels of each of the same colors are electrically connected to each other. A transparent electrode 8Ra of the upper left unit pixel 2a connects by a lower side thereof to a transparent electrode 8Rc of the lower left unit pixel 2c, a transparent electrode 8Ga of the upper left unit pixel 2 connects by a lower side thereof to a transparent electrode 8Gc of the lower left unit pixel 2c, and a transparent electrode 8Ba of the upper left unit pixel 2 connects by a lower side thereof to a transparent electrode 8Bc of the lower left unit pixel 2c. Meanwhile, a transparent electrode 8Rb of the upper right unit pixel 2b connects by a lower side thereof to a transparent electrode 8Rd of the lower right unit pixel 2d, a transparent electrode 8Gb of the upper right unit pixel 2b connects by a lower side thereof to a transparent electrode 8Gd of the lower right unit pixel 2d, and a transparent electrode 8Bb of the upper right unit pixel 2b connects by a lower side thereof to a transparent electrode 8Bd of the lower right unit pixel 2d. In actual, several ten to several million unit pixels are formed in a longitudinal direction and a lateral direction, and drive electrodes are formed of the transparent electrodes corresponding to the respective colors.

Figure 6:
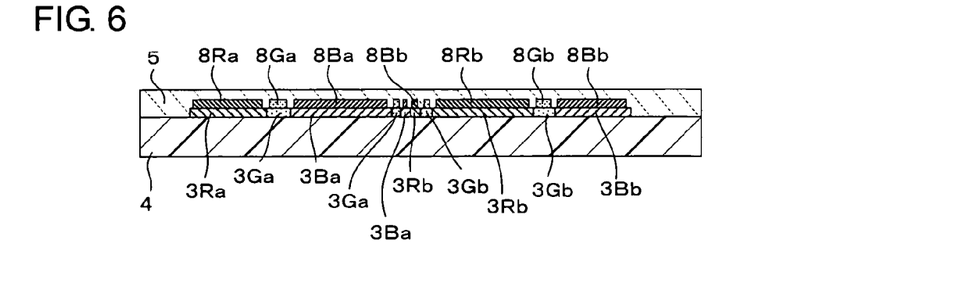
FIG. 6 is a schematic longitudinal cross-sectional view of the color filter substrate according to Embodiment 2 of the present invention.

FIG. 6 is a schematic longitudinal cross-sectional view of the color filter substrate 1, taken along a line P-P' of FIG. 5. The same reference numerals as those of FIG. 5 denote portions which are the same as those of FIG. 5 or have the same functions as those in FIG. 5. As illustrated in FIG. 6, the unit pixel 2a and the unit pixel 2b are formed on a substrate 4 made of glass or the like. Specifically, on the substrate 4 made of the glass, a red sub-pixel 3Ra, a green sub-pixel 3Ga and a blue sub-pixel 3Ba, which form the unit pixel 2a, are formed, and a red sub-pixel 3Rb, a green sub-pixel 3Gb and a blue sub-pixel 3Bb, which form the unit pixel 2b, are formed. Then, the transparent electrodes 8Ra, 8Ga, 8Ba, 8Rb, 8Gb and 8Bb are formed on the sub-pixels 3Ra, 3Ga, 3Ba, 3Rb, 3Gb and 3Bb in a laminated manner, respectively. Further, a planarization layer 5 is formed on the transparent electrodes 8.

It will be appreciated that in this embodiment the transparent electrodes 8 are formed on the sub-pixels 3 as color filter layers, but alternatively, the transparent electrodes 8 may be formed on the substrate 4, and the sub-pixels 3 may be formed on the transparent electrodes 8. Alternatively, the transparent electrodes 8 may be formed on the planarization layer 5.

Further, the three colors of R, G and B are used as the colors of the respective sub-pixels 3 in the above-mentioned respective embodiments, but cyan (C), magenta (M) and yellow (Y) can be used alternatively. Further, the colors are not limited to the three colors, and a combination of other colors can be used. Further, if the adjacent sub-pixels are formed into shapes convoluted to one another, the area of the unit pixel 2 can be further increased.

Embodiment 3

Figure 7A:
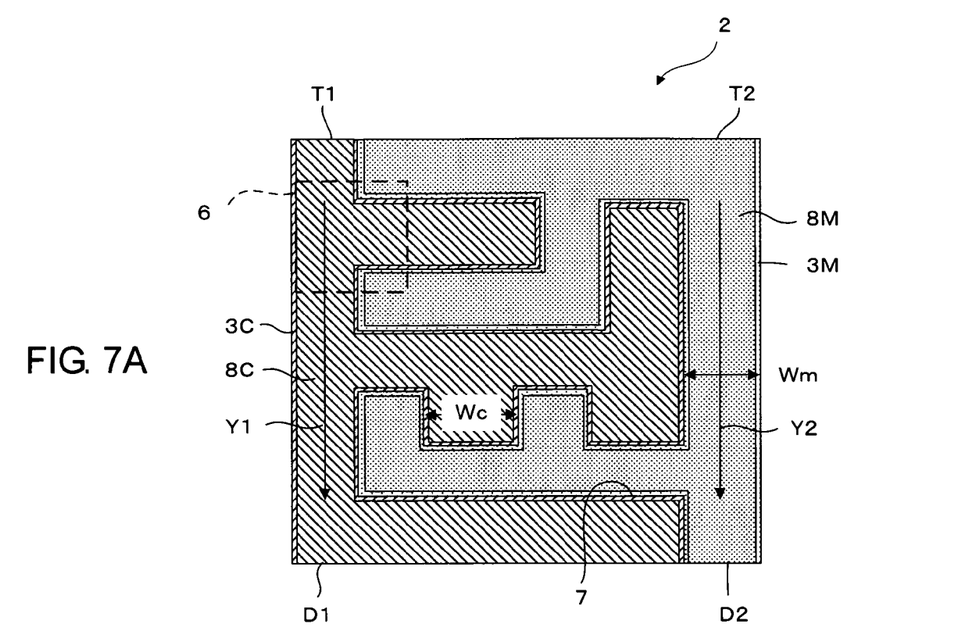
FIGS. 7A and 7B are schematic plan views of a color filter substrate according to Embodiment 3 of the present invention.
Figure 7B:
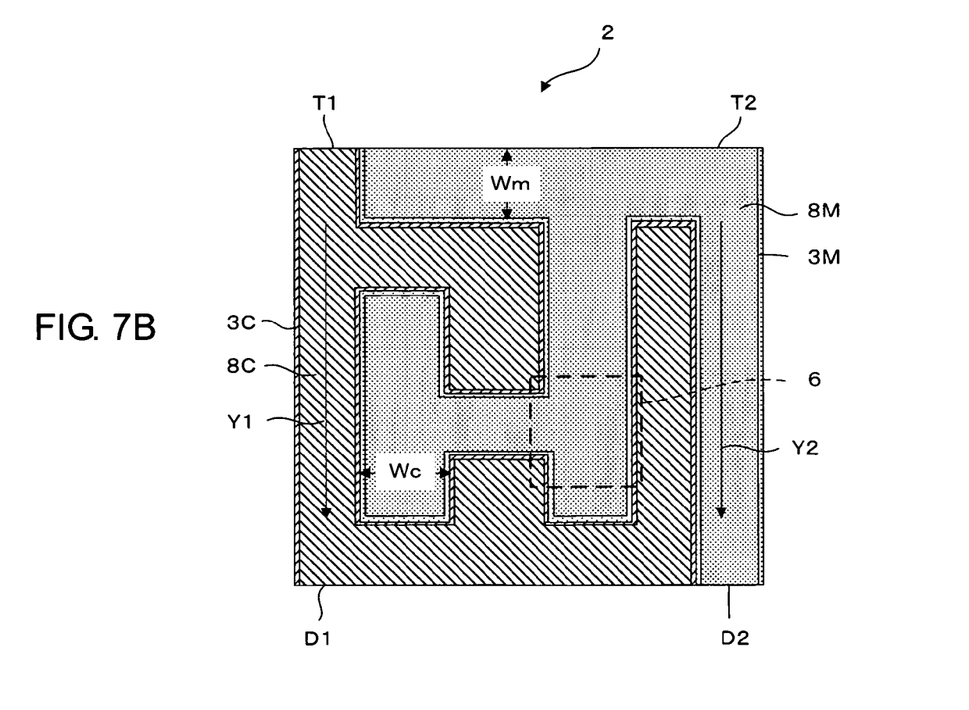

FIGS. 7A and 7B illustrate schematic plan views of a color filter substrate 1 of Embodiment 3 of the present invention. Each of FIGS. 7A and 7B illustrates a case where a unit pixel 2 is formed of sub-pixels of two colors. In FIGS. 7A and 7B, the same reference numerals denote the same portions or portions having the same functions.

As illustrated in FIG. 7A, a cyan sub-pixel 3C of the cyan color and a magenta sub-pixel 3M of the magenta color are formed so as to engage with each other. On the respective sub-pixels, a transparent electrode 8C and a transparent electrode 8M, which have substantially the same shapes as those of the sub-pixels corresponding thereto, are formed so as to be electrically insulated from each other. The respective sub-pixels are formed of continuous planar regions substantially equal in area to each other, and have shapes engaging with each other. Each of maximum line widths Wc and Wm of the sub-pixels does not exceed 150 µm. Alternatively, both of the sub-pixels have continuous shapes, in which a square region 6 with sides of 150 µm is not included. Further, both of the sub-pixels do not have a periodic shape.

The cyan sub-pixel 3C and the magenta sub-pixel 3M are separated from each other by a boundary line 7. The respective sub-pixels have projection/depression portions, and have shapes engaging with each other and convoluted to each other. A length of the boundary line 7 between the sub-pixels, which is illustrated in FIG. 7A, is approximately 1.3 times a length of an outer periphery of the unit pixel 2. Describing more specifically, from an upper side end portion T1 to a lower side end portion D1, the cyan sub-pixel 3C has three projection portions projecting toward the magenta sub-pixel 3M side. Further, the second projection portion counted from the upper side end portion T1 includes one projection portion projecting upward, and two projection portions projecting downward. Further, from an upper side end portion T2 to a lower side end portion D2, the magenta sub-pixel 3M includes two projection portions projecting toward the cyan sub-pixel 3C side. The first projection portion counted from the upper side end portion T2 further includes a projection portion projecting downward, and the second projection portion counted from the upper side end portion T2 further includes two projection portions projecting upward. The line width of each of the sub-pixels does not exceed 150 µm, or alternatively, each of the sub-pixels does not include the square region with sides of 150 µm. Accordingly, in the case where this unit pixel 2 is viewed from a position apart therefrom by a usual distance, the unit pixel 2 is subjected to the additive color mixture.

Further, in the cyan sub-pixel 3C, the shortest length between the upper side end portion T1 and the lower side end portion D1 is an arrow Y1 direction distance, and in the magenta sub-pixel 3M of the unit pixel 2, the shortest length between the upper side end portion T2 and the lower side end portion D2 is an arrow Y2 direction distance. The individual widths in the shortest lengths of the magenta sub-pixel 3M and the cyan sub-pixel 3C are substantially equal to each other. From this fact, wiring resistances of the transparent electrode 8C on the cyan sub-pixel 3C and the transparent electrode 8M on the magenta sub-pixel 3M are substantially equal to each other.

As already described in Embodiment 2, a plurality of the unit pixels illustrated in FIG. 7A are arranged in the longitudinal direction and the lateral direction, whereby a matrix is formed. In this case, the transparent electrodes 8C corresponding to the cyan sub-pixels 3C in the longitudinal direction are electrically connected to one another in the longitudinal direction, whereby drive electrodes can be formed. Likewise, the transparent electrodes 8M corresponding to the magenta sub-pixels 3M in the longitudinal direction are electrically connected to one another in the longitudinal direction, whereby drive electrodes can be formed. In this case, the unit pixels 2 illustrated in FIG. 7A are alternately inverted left and right, the cyan color and the magenta color therein are alternately interchanged, and the unit pixels 2 concerned are arranged in the longitudinal direction and the lateral direction. In such a way, when this color filter substrate 1 is applied to the display body or the like, the occurrence of the moiré can be suppressed.

FIG. 7B illustrates another example of the unit pixel 2 formed of two sub-pixels. The cyan sub-pixel 3C and the magenta sub-pixel 3M include continuous planar regions, and are substantially equal in area to each other. Those two-sub pixels have shapes engaging with each other and convoluted to each other. Each of the maximum line widths Wc and Wm of the sub-pixels does not exceed 150 µm. Alternatively, both of the sub-pixels have continuous planar shapes, each of which does not include the square region 6 with sides of 150 µm. Both of the sub-pixels do not have a periodic shape.

Describing more specifically, from the upper side end portion T1 to the lower side end portion D1, the cyan sub-pixel 3C has two projection portions projecting toward the magenta sub-pixel 3M side. Further, the first projection portion counted from the upper side end portion T1 includes one projection portion projecting downward. Further, from the upper side end portion T2 to the lower side end portion D2, the magenta sub-pixel 3M includes one projection portion projecting toward the cyan sub-pixel 3C side. Further, this projection portion includes a projection portion projecting downward, further, the projection projecting downward includes a projection portion projecting leftward, and further, the projection portion projecting leftward includes projection portions in the longitudinal direction. As a result, in the case where this unit pixel 2 is viewed from the position apart therefrom by the usual distance, the unit pixel 2 is subjected to the additive color mixture. Note that the length of the boundary line 7 in this unit pixel 2 is approximately 1.2 times the length of the outer periphery of the unit pixel 2.

Further, in the cyan sub-pixel 3C of the unit pixel 2, the shortest length between the upper side end portion T1 and the lower side end portion D1 is the arrow Y1 direction distance, and in the magenta sub-pixel 3M of the unit pixel 2, the shortest length between the upper side end portion T2 and the lower side end portion D2 is the arrow Y2 direction distance. The individual widths in the shortest lengths of the magenta sub-pixel 3M and the cyan sub-pixel 3C are substantially equal to each other. From this fact, the wiring resistances of the transparent electrode 8C on the cyan sub-pixel 3C and the transparent electrode 8M on the magenta sub-pixel 3M are substantially equal to each other. The following is the same as in the above-mentioned description with reference to FIG. 7A, that is, a plurality of the unit pixels 2 are arranged in a matrix fashion, and the transparent electrodes corresponding to the sub-pixels of each of the same colors are electrically connected to one another, thus making it possible to form drive electrodes. Accordingly, a detailed description of the above is omitted.

Embodiment 4

Figure 8:
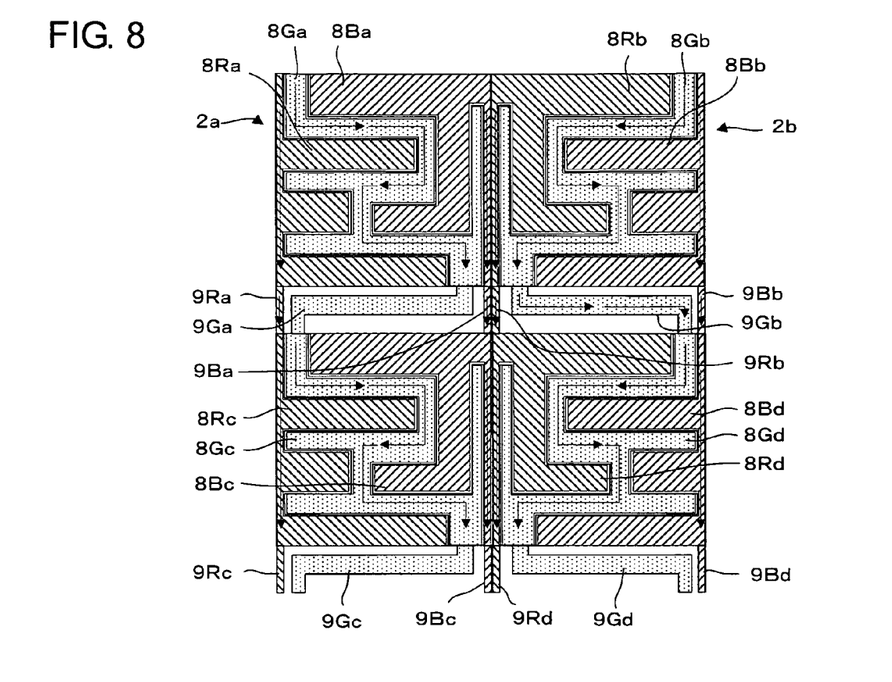
FIG. 8 is a schematic plan view of a color filter substrate according to Embodiment 4 of the present invention.

FIG. 8 schematically illustrates a color filter substrate 1 of Embodiment 4 of the present invention. As illustrated in FIG. 8, four unit pixels 2a, 2b, 2c and 2d are arranged on the color filter substrate 1. On lower sides of the respective unit pixels 2, a plurality of additional electrodes for correcting wiring resistances of transparent electrodes are formed so as to correspond to the respective sub-pixels forming the unit pixel 2. The additional (external) electrodes are formed outside or exteriorly of the corresponding unit pixel 2. A description is specifically made below of the above.

The unit pixel 2a is formed of three sub-pixels, which are a red sub-pixel 3Ra, a green sub-pixel 3Ga and a blue sub-pixel 3Ba. Areas of the respective sub-pixels are substantially equal to one another. A transparent electrode 8Ra having substantially the same shape as that of the red sub-pixel 3Ra is formed on the red sub-pixel 3Ra. Likewise, a transparent electrode 8Ga and a transparent electrode 8Ba are formed on the green sub-pixel 3Ga and the blue sub-pixel 3Ba, respectively. Areas of the respective transparent electrodes are substantially equal to areas of the respective sub-pixels corresponding thereto. The transparent electrodes corresponding to the respective sub-pixels are electrically insulated from one another. In addition, the transparent electrode 8Ga corresponding to the green sub-pixel 3Ga is different in wiring resistance from the other transparent electrode 8Ra or 8Ba.

On the lower side of the unit pixel 2a, additional electrodes 9Ra, 9Ga and 9Ba for resistance correction are formed so as to be electrically insulated from one another. The additional electrode 9Ra is connected to the transparent electrode 8Ra of the unit pixel 2a, the additional electrode 9Ga is connected to the transparent electrode 8Ga of the unit pixel 2a, and the additional electrode 9Ba is connected to the transparent electrode 8Ba of the unit pixel 2a. In the case where the unit pixel has three sub-pixels, the transparent electrode corresponding to the center sub-pixel, that is, the transparent electrode 8Ga becomes higher in wiring resistance than the transparent electrodes corresponding to the sub-pixels on both ends of the unit pixel 2a, that is, the transparent electrodes 8Ra and 8Ba. This is because, as described in Embodiment 2, the center sub-pixel becomes longer in shortest length than the sub-pixels on the both ends of the unit pixel 2a. Therefore, a setting is made so that the additional electrode 9Ga can be smaller in wiring resistance than the additional electrodes 9Ra and 9Ba on ends thereof. In such a way, the unit pixel 2a can be formed so that the sum of the wiring resistance of the transparent electrode 8Ra and the wiring resistance of the additional electrode 9Ra can become substantially equal to the sum of the wiring resistance of the transparent electrode 8Ga and the wiring resistance of the additional electrode 9Ga, or to the sum of the wiring resistance of the transparent electrode 8Ba and the wiring resistance of the additional electrode 9Ba.

The additional electrodes 9Ra, 9Ga and 9Ba are electrically connected to transparent electrodes 8Rc, 8Gc and 8Bc of the unit pixel 2c adjacent to lower ends thereof, respectively. Hence, the transparent electrodes on the sub-pixels of the same colors are electrically connected to each other. The same also applies to a relationship between the unit pixel 2b and the unit pixel 2d. As described above, the additional transparent electrodes for correcting the wiring resistances are formed on the respective unit pixels 2a, 2b, 2c and 2d, whereby voltage drops of drive signals given to the respective transparent electrodes can be substantially equalized to one another. In such a way, even in the case where this color filter substrate 1 is applied as a substrate of a liquid crystal display device, the display color Balance can be maintained. Further, in the liquid crystal display device, the color filter substrate 1 is disposed so as to be opposed to an opposing substrate on which a plurality of opposite electrodes are formed. Hence, it is recommended that spots in which the additional electrodes 9 are formed and gaps among the plurality of opposite electrodes be made to correspond to each other.

Embodiment 5

Figure 9:
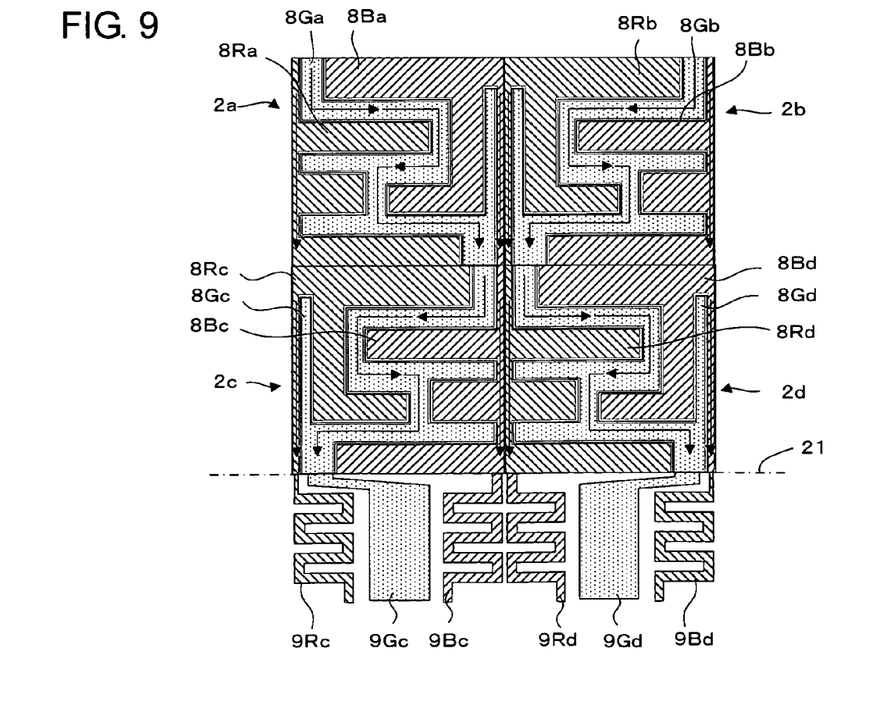
FIG. 9 is a schematic plan view of a color filter substrate according to Embodiment 5 of the present invention.

FIG. 9 schematically illustrates a color filter substrate 1 of this embodiment. As illustrated in FIG. 9, four unit pixels 2a, 2b, 2c and 2d are arranged inside of a display region 21, and additional electrodes 9Rc, 9Gc, 9Bc, 9Rd, 9Gd and 9Bd for correcting wiring resistances of transparent electrodes corresponding to respective sub-pixels are formed outside of the display region 21. A description is specifically made below of the above.

Transparent electrodes 8Ra, 8Ga and 8Ba formed on the unit pixel 2a are connected to transparent electrodes 8Rc, 8Gc and 8Bc formed on the unit pixel 2c, respectively. Specifically, the transparent electrodes corresponding to the sub-pixels of the same colors are connected to each other. Likewise, transparent electrodes 8Rb, 8Gb and 8Bb formed on the unit pixel 2b are connected to transparent electrodes 8Rd, 8Gd and 8Bd formed on the unit pixel 2d, respectively. In such a way, drive electrodes are formed inside of the display region. Specifically, in the case where a plurality of the unit pixels are continuously arrayed, each of the drive electrodes has a configuration in which the transparent electrodes are continuously connected to one another.

Further, the transparent electrodes 8Rc, 8Gc and 8Bc of the unit pixel 2c located on an end of the display region 21 are connected to the additional electrodes 9Rc, 9Gc and 9Bc, respectively. Likewise, the transparent electrodes 8Rd, 8Gd and 8Bd of the unit pixel 2d located on the end of the display region 21 are connected to the additional electrode 9Rd, 9Gd and 9Bd, respectively.

At this time, a difference in wiring resistance may increase among the respective drive electrodes in the unit pixels 2 even if a difference in wiring resistance is not very large among the respective transparent electrodes 8R, 8G and 8B therein. For example, the drive electrodes corresponding to the green sub-pixels, which are wired on the center of the unit pixels 2, become large in wiring resistance more than the drive electrodes corresponding to the red and blue sub-pixels on both sides thereof. Accordingly, a configuration is made so that the wiring resistances of the additional electrodes 9Gc and 9Gd can become smaller than the wiring resistances of the other additional electrodes 9Rc, 9Bc, 9Rd and 9Bd. In such a way, the wiring resistances of the drive electrodes are corrected. In addition, the individual wiring resistances obtained by adding up the wiring resistances of the respective drive electrodes formed of the transparent electrodes and the wiring resistances of the additional electrodes connected respectively to the drive electrodes concerned are set substantially equal to one another. In such a way, voltage drops of drive signals given to the drive electrodes become substantially equal to one another among the respective drive electrodes. Therefore, when this color filter substrate is applied to the display body such as the liquid crystal display device, the display color balance can be maintained.

As for the drive electrodes, a material of the transparent electrodes can be used as a material of the additional (external) electrodes described in the above-mentioned Embodiments 4 and 5.

Embodiment 6

Figure 10:
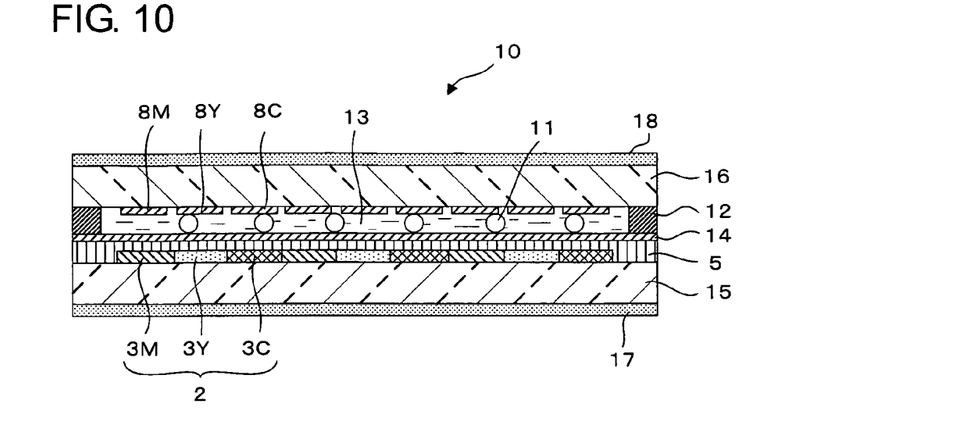
FIG. 10 is a schematic longitudinal cross-sectional view of a liquid crystal display device according to Embodiment 6 of the present invention.

FIG. 10 schematically illustrates a transmission-type liquid crystal display device 10 of this embodiment. As illustrated in FIG. 10, between a lower substrate 15 and an upper substrate 16, a gap is provided while a seal member 12 is interposed therebetween, and a liquid crystal layer 13 is formed in this gap. The lower substrate 15 and the upper substrate 16 are formed of glass substrates or translucent plastic plates. In the liquid crystal layer 13, gap holding members 11 are provided in order to maintain a thickness of the liquid crystal layer. On the liquid crystal layer side of the lower substrate 15, pluralities of magenta sub-pixels 3M, yellow sub-pixels 3Y and cyan sub-pixels 3C are formed, to thereby form color filters. A planarization layer 5 is formed on the respective sub-pixels 3M, 3Y and 3C, and a transparent electrode 14 for driving the liquid crystal layer 13 is formed on the planarization layer 5. On the liquid crystal layer 13 side of the upper substrate 16, there are individually formed transparent electrodes 8M corresponding to the magenta sub-pixels 3M, transparent electrodes 8Y corresponding to the yellow sub-pixels 3Y, and transparent electrodes 8C corresponding to the cyan sub-pixels 3C. Onto outer surfaces of the lower substrate 15 and the upper substrate 16, a lower polarization plate 17 and an upper polarization plate 18 are bonded, respectively. Further, a backlight (not shown) is provided under the lower polarization plate 17.

Each of unit pixels 2 is formed of the magenta sub-pixel 3M, the yellow sub-pixel 3Y and the cyan sub-pixel 3C. The transparent electrodes 8M, 8Y and 8C have substantially the same shapes and areas as those of the sub-pixels 3M, 3Y and 3C, respectively, are electrically insulated from one another, and function as drive electrodes. Specifically, the transparent electrodes corresponding to the sub-pixels of the same colors are electrically connected to one another in a direction normal to a sheet surface of FIG. 10. The respective sub-pixels included in the unit pixels, and the transparent electrodes corresponding thereto, are similar to those of Embodiment 1 and Embodiment 2. Specifically, one unit pixel has an area of 0.1 mm² or more, and each of the sub-pixels is formed of a continuous planar region, in which a line width does not exceed 150 μm, or which does not include therein a square region with sides of 150 μm or more. Further, the adjacent sub-pixels of each of the unit pixels 2 have shapes engaging with one another.

Drive signals are given between the transparent electrode 14 on the lower substrate 15 and the transparent electrodes 8M, 8Y and 8C on the upper substrate 16. Then, molecular orientations of the liquid crystal layer 13 are changed in response to the drive signals, and this change is visualized by the lower polarization plate 17 and the upper polarization plate 18, whereby transmission-type display is obtained. The sub-pixels different in color from one another, which form the unit pixels 2, have a layout as described above, and accordingly, a viewer can view display subjected to additive color mixture. Specifically, even in the case of display with coarse dots in which each of the unit pixels 2 has an area of 0.1 mm² or more, the display quality of the liquid crystal display device 10 is not decreased.

Further, individual resistances of the transparent electrodes 8M, 8Y and 8C corresponding to the respective sub-pixels are set substantially equal to one another in each of the unit pixels 2, whereby voltage drops of the drive signals become equal to one another among the transparent electrodes 8M, 8Y and 8C. Therefore, at the time of display drive, the display does not go out of color balance. Further, even in the case where the individual wiring resistances of the transparent electrodes 8M, 8Y and 8C are varied thereamong, additional electrodes for correcting the wiring resistances are provided to the respective unit pixels 2 or on the outside of the display region as described in Embodiment 4 and Embodiment 5, whereby variations among the voltage drops owing to such variations of the wiring resistances can be corrected. In such a way, such distortion of the color balance can be suppressed.

Embodiment 7

Figure 11:
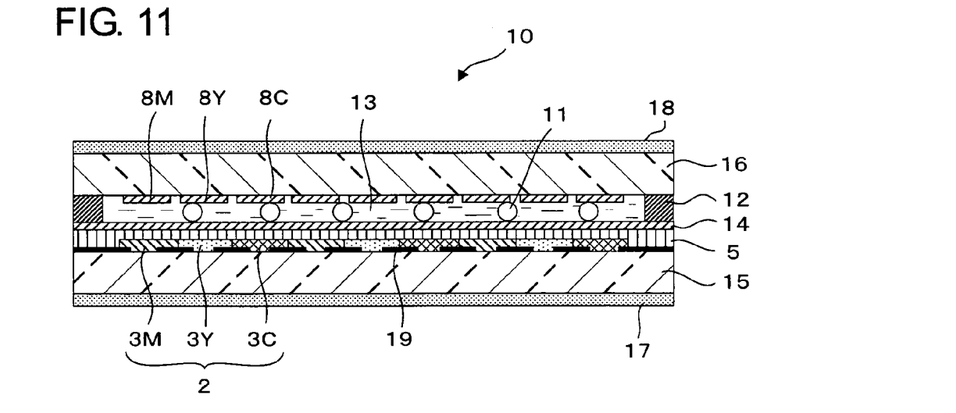
FIG. 11 is a schematic longitudinal cross-sectional view of a liquid crystal display device according to Embodiment 7 of the present invention.

FIG. 11 schematically illustrates a semi-transmission-type liquid crystal display device 10 of this embodiment. In this embodiment, the liquid crystal display device 10 is formed so as to semi-transmit light therethrough by providing a reflection layer 19 between a color filter layer formed of magenta sub-pixels 3M, yellow sub-pixels 3Y and cyan sub-pixels 3C and a lower substrate 15. Embodiment 7 is different from Embodiment 6 in this point. A description is made below of portions of this embodiment, which are different from those of Embodiment 6, and a description of the same configurations other than the above is omitted.

The reflection layer 19 made of aluminum, silver or the like is formed on a surface of the lower substrate 15 on a liquid crystal layer 13 side. This reflection layer 19 is formed on boundary regions among the adjacent sub-pixels, and has opening portions in center portions of regions of the sub-pixels. By this construction, light from a backlight passes through the opening portions of the reflection layer 19, and transmits upward, and accordingly, a transmission-type display can be obtained. On the other hand, light irradiated from above the liquid crystal display device 10 is reflected upward by the reflection layer 19, and accordingly, a reflection-type display can be obtained.

Embodiment 8

Figure 12:
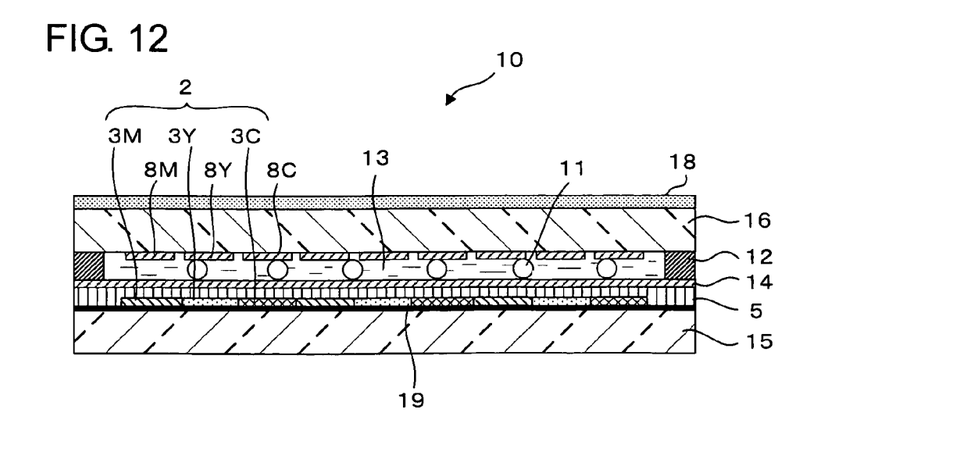
FIG. 12 is a schematic longitudinal cross-sectional view of a liquid crystal display device according to Embodiment 8 of the present invention.

FIG. 12 schematically illustrates a reflection-type liquid crystal display device 10 of this embodiment. This embodiment is different from Embodiment 6 in that a reflection layer 19 is provided under a color filter layer formed of magenta sub-pixels 3M, yellow sub-pixels 3Y and cyan sub-pixels 3C. Hence, a description is made below of configurations of this embodiment, which are different from those of Embodiment 6, and a description of the same configurations other than the above is omitted.

The reflection layer 19 made of aluminum, silver or the like is formed on a liquid crystal layer 13-side surface of a lower substrate 15. On a surface of the lower substrate 15, which is opposite to the liquid crystal layer 13 side, a lower polarization plate 17 is not provided. Hence, light irradiated from the above passes through the respective sub-pixels, and is thereafter reflected upward by the reflection layer 19. Specifically, reflection-type display can be obtained.

In the above-mentioned respective embodiments, the description has been made of the sub-pixels having a rectangular shape. However, the sub-pixels of the present invention are not limited to this shape. The sub-pixels may have a curved shape, or may have a circular shape or an ellipsoidal shape. Further, it is not necessary that the additional (external) electrodes be transparent electrodes, and the additional electrodes may be resistors formed of conductor thin films. It will be appreciated that if transparent electrodes made of the same material as that of the sub-pixels are used as the additional electrodes, then the manufacturing steps of the liquid crystal display device are not increased, and accordingly, a cost increase can be suppressed.

What is claimed is:

1. A color filter substrate comprising:
   a plurality of unit pixels arrayed two-dimensionally in a matrix, each of the unit pixels comprising:
   a plurality of sub-pixels including a first sub-pixel having a first color, a second sub-pixel adjacent to the first sub-pixel and having a second color different from the first color, and a third sub-pixel having a third color different from the first and second colors and being disposed adjacent to the second sub-pixel so that the second sub-pixel is disposed between the first and third sub-pixels, each of the first, second and third sub-pixels being configured with a different shape from one another such that the first, second and third sub-pixels form a preselected engagement pattern via which the second sub-pixel engages the adjacent first sub-pixel and the third sub-pixel engages the adjacent second sub-pixel, and the first, second and third sub-pixels of a first one of the plurality of unit pixels having a different planar shape from the respective first, second and third sub-pixels of a second one of the plurality of unit pixels; and a plurality of transparent electrodes electrically insulated from one another and including a first transparent electrode formed on and having substantially the same planar shape as that of the first sub-pixel, a second transparent electrode formed on and having substantially the same planar shape as that of the second sub-pixel, and a third transparent electrode formed on and having substantially the same planar shape as that of the third sub-pixel.

2. A color filter substrate according to claim 1; further comprising a third unit pixel comprised of first, second and third sub-pixels and first, second and third transparent electrodes formed on the respective first, second and third sub-pixels; wherein the first, second and third transparent electrodes of the third unit pixel are electrically insulated from the respective first, second and third transparent electrodes of the first unit pixel; and wherein the first, second and third sub-pixels of the third unit pixel have different planar shapes from those of the respective first, second and third sub-pixels of the first unit pixel.

3. A color filter substrate according to claim 2; wherein the planar shape of the first sub-pixel of the first unit pixel is micro-symmetric with the planar shape of the third sub-pixel of the third unit pixel, the planar shape of the third sub-pixel of the first unit pixel is mirro-symmetric with the planar shape of the first sub-pixel of the third unit pixel, and the planar shape of the second sub-pixel of the first unit pixel is mirro-symmetric with the planar shape of the second sub-pixel of the third unit pixel.

4. A color filter substrate according to claim 3; wherein the planar shape of the first sub-pixel of the second unit pixel is the same as the planar shape of the first sub-pixel of the third unit pixel, the planar shape of the second sub-pixel of the second unit pixel is the same as the planar shape of the second sub-pixel of the third unit pixel, and the planar shape of the third sub-pixel of the second unit pixel is the same as the planar shape of the third sub-pixel of the third unit pixel.

5. A color filter substrate according to claim 1; wherein the planar shape of the first sub-pixel of the first unit pixel and a planar shape of the third sub-pixel of the second unit pixel are mirror-symmetric with respect to a Y-axis having a direction connecting the transparent electrodes corresponding to the first unit pixel with the transparent electrodes corresponding to the second unit pixel, and the planar shape of the second sub-pixel of the first unit pixel and a planar shape of the second sub-pixel of the second unit pixel are mirror-symmetric with respect to the Y-axis.

6. A color filter substrate according to claim 1; wherein the first, second and third sub-pixels of each of the first and second unit pixels have areas that are substantially equal to one another.

7. A color filter substrate according to claim 1; wherein electrical resistances of the first, second and third transparent electrodes are substantially equal to one another between one side of the outer periphery of each of the unit pixels and another side of the outer periphery of each of the unit pixels opposite to the one side.

8. A color filter substrate according to claim 1; wherein an area of each of the unit pixels is greater than or equal to 0.25 mm$^2$.

9. A color filter substrate according to claim 1; wherein each of the first, second and third sub-pixels of each unit pixel has a line width less than or equal to 150 μm.

10. A color filter substrate according to claim 1; wherein an area of each of the unit pixels is greater than or equal to 0.25 mm$^2$; and wherein each of the first, second and third sub-pixels of each unit pixel has a line width less than or equal to 150 μm.

11. A color display device comprising:

a color filter substrate comprised of a plurality of unit pixels arrayed two-dimensionally in a matrix, each of the unit pixels comprising:

a plurality of sub-pixels including a first sub-pixel having a first color, a second sub-pixel adjacent to the first sub-pixel and having a second color different from the first color, and a third sub-pixel having a third color different from the first and second colors and being disposed adjacent to the second sub-pixel so that the second sub-pixel is disposed between the first and third sub-pixels, each of the first, second and third sub-pixels being configured with a different shape from one another such that the first, second and third sub-pixels form a preselected engagement pattern via which the second sub-pixel engages the adjacent first sub-pixel and the third sub-pixel engages the adjacent second sub-pixel, and the first, second and third sub-pixels of a first one of the plurality of unit pixels having a different planar shape from the respective first, second and third sub-pixels of a second one of the plurality of unit pixels; and a plurality of transparent electrodes electrically insulated from one another and including a first transparent electrode formed on and having substantially the same planar shape as that of the first sub-pixel, a second transparent electrode formed on and having substantially the same planar shape as that of the second sub-pixel, and a third transparent electrode formed on and having substantially the same planar shape as that of the third sub-pixel;

an opposing substrate opposed to the color filter substrate; and a liquid crystal layer filled between the color filter substrate and the opposed substrate.

12. A color display device according to claim 11; wherein the color filter substrate further comprises a third unit pixel comprised of first, second and third sub-pixels and first, second and third transparent electrodes formed on the respective first, second and third sub-pixels; wherein the first, second and third transparent electrodes of the third unit pixel are electrically insulated from the respective first, second and third transparent electrodes of the first unit pixel; and wherein the first, second and third sub-pixels of the third unit pixel have different planar shapes from those of the respective first, second and third sub-pixels of the first unit pixel.

13. A color display device according to claim 12; wherein the planar shape of the first sub-pixel of the first unit pixel is mirro-symmetric with the planar shape of the third sub-pixel of the third unit pixel, the planar shape of the third sub-pixel of the first unit pixel is mirro-symmetric with the planar shape of the first sub-pixel of the third unit pixel, and the planar shape of the second sub-pixel of the first unit pixel is mirro-symmetric with the planar shape of the second sub-pixel of the third unit pixel.

14. A color display device according to claim 13; wherein the planar shape of the first sub-pixel of the second unit pixel is the same as the planar shape of the first sub-pixel of the third unit pixel, the planar shape of the second sub-pixel of the second unit pixel is the same as the planar shape of the second sub-pixel of the third unit pixel, and the planar shape of the third sub-pixel of the second unit pixel is the same as the planar shape of the third sub-pixel of the third unit pixel.

15. A color display device according to claim 11; wherein the planar shape of the first sub-pixel of the first unit pixel and a planar shape of the third sub-pixel of the second unit pixel are mirror-symmetric with respect to a Y-axis having a direction connecting the transparent electrodes corresponding to the first unit pixel with the transparent electrodes corresponding to the second unit pixel, and the planar shape of the second sub-pixel of the first unit pixel and a planar shape of the second sub-pixel of the second unit pixel are mirror-symmetric with respect to the Y-axis.

16. A color display device according to claim 11; wherein the first, second and third sub-pixels of each of the first and second unit pixels have areas that are substantially equal to one another.

17. A color display device according to claim 11; wherein electrical resistances of the first, second and third transparent electrodes are substantially equal to one another between one side of the outer periphery of each of the unit pixels and another side of the outer periphery of each of the unit pixels opposite to the one side.

18. A color display device according to claim 11; further comprising first, second and third external electrodes for each of the unit pixels and formed exteriorly of the corresponding unit pixel for electrical connection to the respective transparent electrodes of the corresponding unit pixel; and wherein a sum of a total wiring resistance of the first transparent electrode and a wiring resistance of the first external electrode, a sum of a total wiring resistance of the second transparent electrode and a wiring resistance of the second external electrode, a sum of a total wiring resistance of the third transparent electrode and a wiring resistance of the third external electrode are substantially equal to one another.

19. A color display device according to claim 11; further comprising first, second and third external electrodes formed between adjacent ones of the unit pixels for electrical connection to the respective transparent electrodes of the unit pixels; and wherein a sum of a total wiring resistance of the first transparent electrode and a wiring resistance of the first external electrode, a sum of a total wiring resistance of the second transparent electrode and a wiring resistance of the second external electrode, a sum of a total wiring resistance of the third transparent electrode and a wiring resistance of the third external electrode are substantially equal to one another.

20. A color display device according to claim 11; wherein an area of each of the unit pixels is greater than or equal to 0.25 mm$^2$.

21. A color display device according to claim 11; wherein each of the first, second and third sub-pixels of each unit pixel has a line width less than or equal to 150 µm.

22. A color display device according to claim 11; wherein an area of each of the unit pixels is greater than or equal to 0.25 mm$^2$; and wherein each of the first, second and third sub-pixels of each unit pixel has a line width less than or equal to 150 µm.

23. A color display device according to claim 11; wherein the preselected engagement pattern formed by the first, second and third sub-pixels of each of the pixels unit comprises a serpentine-shaped pattern.

* * * * *